United States Patent [19]

South, Jr.

[11] 3,928,270

[45] Dec. 23, 1975

[54] THERMOSETTING COMPOSITIONS

[75] Inventor: Aubrey South, Jr., Bartlesville, Okla.

[73] Assignee: Phillips Petroleum Company, Bartlesville, Okla.

[22] Filed: Feb. 8, 1973

[21] Appl. No.: 330,677

[52] U.S. Cl. .................. 260/23.7 M; 260/23.7 R; 260/31.2 MR; 260/31.8 DR; 260/42.37; 260/42.47; 260/94.9 GA
[51] Int. Cl.² .................................... C08L 91/00
[58] Field of Search ............... 260/23.7 M, 23.7 R, 260/94.9 GA, 45.5, 31.2 MR, 31.8 DR, 260/42.37, 42.47; 152/330

[56] References Cited
UNITED STATES PATENTS

| | | | |
|---|---|---|---|
| 2,912,410 | 11/1959 | Cole | 260/94.9 GA |
| 3,060,989 | 10/1962 | Railsback | 152/330 |
| 3,083,175 | 3/1963 | Safford | 260/45.5 |
| 3,317,446 | 5/1967 | Wilder | 260/23.7 M |
| 3,325,429 | 6/1967 | Harris | 260/23.7 M |
| 3,334,080 | 8/1967 | Blanchard | 260/94.9 GA |
| 3,350,380 | 10/1967 | Strobel | 260/23.7 M |
| 3,443,620 | 5/1969 | Vanderbilt | 152/330 |
| 3,786,009 | 1/1974 | Lohr | 260/23.7 M |

OTHER PUBLICATIONS

Skeist I, "Handbook of Adhesives", 1962, (pp. 420 & 422).

*Primary Examiner*—Melvyn I. Marquis

[57] ABSTRACT

An improved thermosetting composition comprises a high vinyl polymer of a conjugated diene, a metal silicate filler, a silane coupling agent, an organic peroxide curing agent, and an organic acid or an anhydride thereof.

21 Claims, No Drawings

THERMOSETTING COMPOSITIONS

This invention relates to thermosetting compositions. Polymers of at least one conjugated diene having a high vinyl content for the polymer can be cured to give rigid molded articles having high heat distortion temperature, excellent electrical properties, and good solvent resistance. The curing of the polymer of at least one conjugated diene is generally initiated by a peroxide which results in a highly exothermic cyclization and crosslinking process. Cyclization in an unfilled polymer is accompanied by substantial mold shrinkage; thus, higher filler levels are necessary to prevent cracking of the molded article during curing. The filler also serves as the heat sink for the exothermic cure and helps prevent charring, which would occur in unfilled molding compositions unless cured very slowly at very low peroxide levels.

It has become advantageous to employ high molecular weight polymers of at least one conjugated diene, and particularly high vinyl polybutadiene, in thermosetting compositions designed for injection molding as the highly filled compositions based on these high molecular weight polymers can be processed into a free-flowing form for facile addition to the injection molding machines. However, the higher molecular weight conjugated diene polymers result in a higher compounded viscosity which reduces processability in molding machines. Various types of fillers, including the silicas and metal silicates, have been evaluated for use with the high molecular weight conjugated diene polymers. Although various silicas have properties making them attractive for utilization as fillers in the thermosetting compositions, the silicas tend to be abrasive and many of the silicas contribute to an increase in the melt viscosity of the thermosetting composition. The metal silicates have been found to be desirable in the filled polymers because of lower abrasive values. However, except for flexural modulus, the properties of the cured molded article employing the metal silicates of pH greater than 7 are generally inferior to the properties of molded articles prepared under identical conditions except for the use of silica instead of the metal silicate. It has now been discovered that the cured properties of articles molded from a thermosetting composition comprising a polymer of at least one conjugated diene and a metal silicate filler can be significantly improved to be at least equivalent to the properties of molded articles prepared from a silica filled thermosetting composition. This improvement can be achieved by the addition to the metal silicate filled thermosetting composition of an organic acid or an anhydride thereof.

Accordingly, it is an object of this invention to provide a new and improved thermosetting molding composition. Another object of the invention is to provide a thermosetting composition having low melt viscosities. Another object of the invention is to provide a molded article having improved physical characteristics. Other objects, aspects and advantages of the invention will be apparent from a study of the specification and the appended claims.

The conjugated diene polymers which are suitable for use in the present invention include the polymers of at least one conjugated diene having from 4 to 10 carbon atoms per molecule, the polymer having at least about at least 50 percent, and preferably from about 70 to about 90 percent, of the unsaturation thereof in the form of pendant groups containing olefinic unsaturation. The conjugated diene polymer can be a linear polymer or a radial polymer, and can be either predominantly amorphous or predominantly crystalline in nature. In general the conjugated diene polymer will have a molecular weight in the range of from about 1000 to about 1,000,000 as determined by gel permeation chromatography, with a molecular weight in the range of about 5000 to about 300,000 being presently preferred. For most molding operations, a polybutadiene having an inherent viscosity in the range of about 0.25 to about 3, preferably in the range of about 0.3 to about 2 is particularly useful.

Suitable conjugated dienes include butadiene-1,3; alkyl- and aryl-substituted-1,3-butadienes; pentadiene-1,3; alkyl-substituted-1,3-pentadienes; and admixtures thereof. Butadiene-1,3 is presently preferred. Exemplary conjugated diene polymers include polybutadiene, polyphenylbutadiene, poly(1-isopropyl-2-methylbutadiene), poly(2-methyl-1,3-pentadiene), polyisoprene, polypentadiene, a copolymer of butadiene-1,3 and phenylbutadiene-1,3, a copolymer of butadiene-1,3 and isoprene, and the like, and blends thereof.

The thermosetting molding compositions of the invention include an organic peroxide compound as a curing agent for the conjugated diene polymer. Suitable organic peroxy compounds include the dihydrocarbyl peroxides, the peroxy esters, and the peroxy ketals, preferably containing up to about 30 carbon atoms per molecule. Exemplary organic peroxy compounds include t-butyl peroxybenzoate, di-t-butyl peroxide, dicumyl peroxide, t-butylperoxy isopropyl carbonate, n-butyl-4,4-bis(t-butylperoxy)valerate, $\alpha,\alpha'$-bis(t-butylperoxy)diisopropyl benzene, 2,5-dimethyl-2,5-bis(t-butylperoxy)hexane, 2,5-dimethyl-2,5-bis(t-butylperoxy)-3-hexyne, 2,5-dimethyl-2,5-dihydroperoxyhexane, and admixtures thereof.

Although any of the metal silicates can be employed as the filler in the thermosetting molding composition of the present invention, the metal silicates which are at least substantially water insoluble are presently preferred because of their resistance to being leached from the molded article. Natural metal silicates as well as synthetic metal silicates can be employed. The silicates of at least one metal selected from the group consisting of calcium, magnesium, silver, nickel, lead, cadmium manganese and copper are presently preferred, with the calcium silicate being the most preferred. Natural silicates which are suitable for use in the invention include asbestos, feldspar, fuller's earth, mica, pumice, rottenstone, slags, slate, talc, Wollastonite, vermiculite, zeolites, and admixtures thereof. The synthetic silicates, which are at least substantially insoluble in water, include calcium silicate, magnesium silicate, silver silicate, nickel silicate, lead silicate, cadmium silicate, manganese silicate, copper silicate, and admixtures thereof.

The organic acids or anhydride thereof which can be employed in the process of the present invention include the monobasic and polybasic aliphatic saturated and unsaturated carboxylic acids, containing from 2 to 30 carbon atoms per molecule, preferably from 2 to 18 carbon atoms per molecule, and the anhydrides thereof. Examples of suitable saturated monobasic carboxylic acids having the formula $C_nH_{2n+1}COOH$ wherein $n$ is an integer in the range of 1 to 29 include acetic acid, lauric acid, stearic acid, behenic acid, and admixtures thereof. The corresponding anhydrides have the formula $(C_nH_{2n+1}CO)_2O$ wherein $n$ is an integer in the range of 1 to 29, and include acetic anhydride, lauric anhydride, stearic anhydride, behenic anhydride, and admixtures thereof.

Examples of suitable saturated dicarboxylic acids having the formula $C_nH_{2n}(COOH)_2$ wherein $n$ is an integer in the range of 1 to 28, include oxalic acid, succinic acid, azelaic acid, sebacic acid and 1,28-octacosanedicarboxylic acid, and admixtures thereof. The corresponding anhydrides have the formula $(C_nH_{2n}CO)_2O$ wherein $n$ is an integer in the range of 1 to 28 and include succinic anhydride and glutaric anhydride, and admixtures thereof.

Examples of the monounsaturated monobasic carboxylic acids which have the formula $C_nH_{2n-1}COOH$ wherein $n$ is an integer in the range of 2 to 29 include acrylic acid, sorbic acid, oleic acid, erucic acid, brassidic acid and triacontenoic acid, and admixtures thereof. The corresponding anhydrides have the formula $(C_nH_{2n-1}CO)_2O$ wherein $n$ ia an integer in the range of 2 to 29, and a representative example is brassidic anhydride.

Examples of the monounsaturated dicarboxylic acids having the formula $C_nH_{2n-2}(COOH)_2$ wherein $n$ is an integer in the range of 2 to 28, preferably include maleic, fumaric, citraconic acid, n-butylmaleic acid, itaconic acid, methylitaconic acid, n-butylitaconic acid, dimethylitaconic acid, n-dodecyl-maleic acid, and admixtures thereof. The corresponding anhydrides have the formula $(C_nH_{2n-2}CO)_2O$ wherein $n$ is an integer in the range of 2 to 28, and include maleic anhydride, citraconic anhydride, n-butylitaconic anhydride, n-dodecylcitraconic anhydride, and the like, and admixtures thereof.

An example of a suitable tetracarboxylic acid which can be employed is 2,3,5,6-tetracarboxy-bicyclo[2.2.2]-octene-8. The corresponding anhydride is 2,3,5,6-tetracarboxy-bicyclo[2.2.2]-octene-8dianhydride.

The coupling agents enhance the properties of the molded article by promoting the adhesion of the polymer to the filler. The silanes which can be employed as coupling agents in accordance with the present invention include tris(2-methoxyethoxy) vinyl silane, vinyltriethoxysilane, beta-(3,4-epoxycyclohexyl)-ethyltrimethoxysilane, gamma-glycidoxypropyltrimethoxysilane, gamma-aminopropyltriethoxysilane, gamma-mercaptopropyltrimethoxysilane, vinyltriacetoxysilane, N-beta-(aminoethyl)-gamma-aminopropyltrimethoxysilane, and the like, and mixtures thereof. Tris(2-methoxyethoxy) vinyl silane is the presently preferred coupling agent. The products produced by curing in the presence of a suitable coupling agent retained their flexural properties much longer than such products compounded and cured in the absence of the coupling agents.

The ratio of the various components in the composition of the present invention can vary in accordance with the specific materials employed and with the characteristics desired for the molded product. In general, the metal silicate filler will be employed to provide an amount in the range of about 40 to about 500 parts by weight per 100 parts by weight of the polymer, and preferably an amount in the range of about 100 to about 400 parts by weight per 100 parts by weight of the polymer. The organic acid or anhydride will generally be present in the composition in an amount in the range of about 0.1 to about 10 parts by weight per 100 parts by weight of the polymer, preferably in an amount in the range of about 1 to about 3 parts by weight per 100 parts by weight of the polymer.

The amount of the silane employed will depend upon the quantity and particle size of the metal silicate filler, the greater the surface area of the filler the greater the amount of the silane employed. In general the silane will be present in an amount in the range of about 0.1 to about 10 parts by weight per 100 parts by weight of the polymer, and preferably in the range of about 0.5 to about 5 parts by weight per 100 parts by weight of the polymer. The organic peroxide curing agent will generally be employed in an amount in the range of about 1 to about 12 parts by weight per 100 parts by weight of the polymer, and preferably in the range of about 2 to about 8 parts by weight per 100 parts by weight of the polymer.

The thermosetting molding composition of the invention can include processing aids, example of which includes the metal carboxylates such as calcium and zinc stearates, naturally occurring and synthetic waxes such as beeswax, ceresin, Fischer-Tropsch wax, microcrystalline wax, polyethylene wax; amides such as erucamide, oleamide, stearamide, ethylene bis(stearamide) and the like, and admixtures thereof. These processing aids, which can be employed to reduce the apparent viscosity of the molding composition, will generally be present, when employed, in an amount in the range of about 1 to about 8 parts by weight per 100 parts by weight of the polymer, preferably in the range of about 2 to about 4 parts by weight per 100 parts by weight of the polymer. Other additives such as antioxidants, pigments, antistatic agents, and the like can also be employed in the thermosetting molding composition.

The components of the thermosetting molding composition should be uniformly mixed prior to molding. This can be done in any manner known in the art. For example, the blend ingredients can be mixed in a Plastograph such as manufactured by the C. W. Brabender Company, and then further homogenized on a roll mill. In both the Plastograph and roll mill operation, elevated temperatures may be employed. However, the temperature employed should be below the activation temperature for the peroxide curing agent to avoid premature curing of the blend. A Banbury mixer or other types of mixing devices can also be employed to mix the ingredients of the thermosetting composition.

The thermosetting compositions of the invention can be molded and cured at elevated temperatures, for example, from about 150° to about 200°C for a period of time in the range of about 5 minutes to about 1 hour.

The following examples are presented in further illustration of the invention and should not be construed in undue limitation thereof.

EXAMPLE I

In each of the following runs the thermosetting molding composition comprised a tin tetrachloride coupled polybutadiene having a Mooney of 39 ML-4 and an inherent viscosity of 1.62, with 75 percent of the unsaturation of the polymer being in the form of pendant vinyl groups; 1 phr tris(2-methoxyethoxy) vinyl silane; 2 phr zinc stearate, except as otherwise noted; 4 phr 2,5-dimethyl-2,5-bis(t-butylperoxy)-3-hexyne with various fillers and acids as indicated. In each run the molding composition was compression molded for 5 minutes at 400°F at a pressure in the range of 20,000 to 30,000 psi. Phr is parts by weight of the indicated component per 100 parts by weight of conjugated diene polymer.

each run the composition was compression molded for 5 minutes at 400°F at a pressure in the range of 20,000

TABLE I

| Run No. | Filler at 300 phr | Acid at 2 phr | Melt Flow 10X/120C | Flex. Mod. psi ×10⁻³ at 25C | at 150C | Tensile Break, psi at 25C | at 150C | Flex. Str., psi | Shore D Hardness | Unnotched Izod Ft-lb/in. |
|---|---|---|---|---|---|---|---|---|---|---|
| 1 | Wollastonite F-1ᵃ | None | 6.8 | 1430 | 522 | 4540 | 2390 | 6230 | 93 | 1.1 |
| 2 | Wallastonite F-1ᵃ | Fumaric | 2.8 | 1470 | 540 | 6550 | 3130 | 9010 | 92 | 1.8 |
| 3 | Wollastonite C-1ᵇ | None | 7.4 | 1300 | 492 | 4070 | 2190 | 6110 | 93 | 0.9 |
| 4 | Wollastonite C-1ᵇ | Fumaric | 4.8 | 1410 | 520 | 6560 | 3350 | 9020 | 93 | 1.4 |
| 5 | Wollastonite P-4ᶜ | None | 4.5 | 1260 | 532 | 5340 | 2740 | 6450 | 93 | 0.9 |
| 6 | Wollastonite P-4ᶜ | Fumaric | 3.0 | 1300 | 523 | 6000 | 2950 | 8300 | 93 | 1.0 |
| 7 | Nepheline Syeniteᵈ | None | — | 1110 | 453 | 5070 | — | — | 92 | 1.2 |
| 8 | Nepheline Syeniteᵈ | Fumaric | — | 1110 | 446 | 6520 | — | — | 94 | 1.4 |
| 9 | Talcᵉ | None | 0.7 | 2180 | 915 | 5280 | 3420 | 8190 | — | 1.2 |
| 10 | Talcᵉ | Stearic | 1.2 | 2200 | 842 | 6210 | 4270 | 8980 | — | 1.4 |
| 11 | (225 phr Wollas-tonite P-1) (75 phr TiO₂) | None | 8.4 | 1300 | 540 | 6210 | 3400 | 8420 | 93 | 1.1 |
| 12 | " | | | | | | | | | |
| 13 | Micro White No. 50 CaCO₃ | Stearicᶠ | 15.0 | 1210 | 377 | 7260 | 3570 | — | 92 | 1.9 |
| 14 | " | Noneᵍ | 7.2 | 887 | 389 | 3400 | 1760 | 5850 | 90 | 1.2 |
| 15 | " | Stearicᵍ | 7.7 | 872 | 301 | 2830 | 1260 | 5040 | 89 | 1.2 |
| 16 | Novacite No. 200 silica | Fumaricᵍ | 3.7 | 964 | 435 | 3810 | 1530 | 5130 | 93 | 0.9 |
| 17 | " | None | 6.0 | 1010 | 300 | 4860 | — | — | — | — |
|  | " | Stearic | 9.4 | 459 | 90 | 3030 | — | — | — | — |

ᵃWollastonite F-1 is a naturally occurring calcium silicate having a particle size, expressed as 50% median size, of 22 microns.
ᵇWollastonite C-1 is a naturally occurring calcium silicate having a particle size, expressed as 50% median size, of 13 microns.
ᶜWollastonite P-4 is a naturally occurring calcium silicate having a particle size, expressed as 50% median size, of 5.5 microns.
ᵈThe nepheline syenite is a mixture of 56 weight percent albite (NaAlSi₃O₈), 22 weight percent microline (K AlSi₃O₈), and 22 weight percent nepheline ([Na,K] Al SiO₄), having a particle size, expressed as 50% median in size, of less than 10 microns.
ᵉ2 Phr tris(2-methoxyethoxy) vinyl silane, 2 phr calcium stearate, 2 phr Be Square wax 180/185 (micro-crystalline wax, Bareco Division of Petrolite Co., Tulsa).
ᶠ3 Phr tris(2-methoxyethoxy) vinyl silane, 1.5 phr calcium stearate, 4 phr stearic acid.
ᵍ2 Phr calcium stearate, in addition to acid shown.

Runs 1 to 12 show that fumaric acid or stearic acid provide significant improvements in the characteristics of the products molded from the thermosetting compositions containing metal silicates, while runs 13 to 17 show the addition of stearic acid or fumaric acid to molding compositions containing calcium carbonate or Novacite silica did not provide the corresponding improvements.

to 30,000 psi.

TABLE II

| Run No. | phr | Anhydride type | Melt Flow 10X/120C | Flex. Mod. psi ×10⁻³ at 25C | at 150C | Tensile Break, psi at 25C | at 150C | Flex. Str., psi | Shore D Hardness | Unnotched Izod Ft-lb/in. |
|---|---|---|---|---|---|---|---|---|---|---|
| 1 | — | None | 1 | 1010 | 350 | 3140 | 1350 | 4860 | 89 | 0.8 |
| 2 | 2 | Maleic Anhydride | 2.0 | 1250 | 380 | 5150 | 1690 | 7370 | 92 | 1.6 |
| 3 | 4 | Maleic Anhydride | 1.4 | 1210 | 350 | 5490 | 2200 | 8160 | 93 | 1.4 |
| 4 | 2 | (2,3,5,6-tetra-carboxy-bicyclo[2.2.2]-octene-8 dianhydride) | 3.7 | 1160 | 440 | 3820 | 1660 | 5690 | 90 | 0.9 |
| 5 | 4 | " | 4.3 | 1270 | 460 | 3730 | 1360 | 6100 | 90 | 0.9 |

These runs indicate that the objectives of the present invention can be achieved through the utilization of the anhydride of an organic acid.

EXAMPLE III

In the following runs, a tin tetrachloride coupled polybutadiene having a Mooney of 39 ML-4, an inherent viscosity of 1.62, with 75 percent of the unsaturation of polymer being in the form of pendant vinyl groups, was admixed with 300 phr Wollastonite F-1, 1 phr tris(2-methoxyethoxy) vinyl silane, 2 phr zinc stearate, and 4 phr 2,5-dimethyl-2,5-bis(t-butylperoxy)-3-hexyne. In each run the molding composition was compression molded for 5 minutes at 400°F at a pressure in the range of 2000 to 30,000 psi.

EXAMPLE II

In the following runs, a tin tetrachloride coupled polybutadiene having a Mooney of 39 ML-4, an inherent viscosity of 1.62, with 75 percent of the unsaturation being in the form of pendant vinyl groups, was admixed with 300 phr Wollastonite F-1, 1 phr tris(2-methoxyethoxy) vinyl silane, 2 phr zinc stearate, and 4 phr 2,5-dimethyl-2,5-bis(t-butylperoxy)-3-hexyne. In

TABLE III

| Run No. | Acid, 2 phr | Flex. Mod. psi ×10⁻³ at 25C | at 150C | Tensile Break, psi at 25C | at 150C | Flex. Str. | Unnotched Shore D Izodᵃ | Hardness |
|---|---|---|---|---|---|---|---|---|
| 1 | None | 1590 | 596 | 4240 | 1920 | 6250 | 1.13 | 90 |
| 2 | Stearic | 1560 | 511 | 5540 | 2580 | 8170 | 1.60 | 90 |
| 3 | Acrylic | 1570 | 538 | 6300 | 2600 | 7740 | 1.70 | 92 |
| 4 | Sorbic | 1620 | 612 | 5360 | 2350 | 6890 | 1.38 | 90 |
| 5 | Itaconic | 1650 | 669 | 6260 | 3040 | 9170 | 1.70 | 92 |

TABLE III-continued

| Run No. | Acid, 2 phr | Flex. Mod. psi ×10⁻³ at 25C | at 150C | Tensile Break, Flex. at 25C | at 150C | ched Str. | Unnot- Shore D Izod[a] | Hardness |
|---|---|---|---|---|---|---|---|---|
| 6 | Fumaric | 1640 | 685 | 6510 | 3970 | 9150 | 1.85 | 93 |
| 7 | Maleic | 1680 | 563 | 7230 | 3700 | 9450 | 1.72 | 92 |

[a]⅛-in. thick impact bars

These runs establish that the advantages of the present invention can be achieved through the utilization of various ones of the organic acids.

Unsaturated acids, exemplified by itaconic, fumaric and maleic acids, are effective in improving the physical properties of the compositions as the values for tensile strength, flexural strength, and unnotched Izod impact strength show. Stearic, acrylic and sorbic acids also improve the physical properties of the compositions but to a lesser extent.

EXAMPLE IV

In the following runs a tin tetrachloride coupled polybutadiene having the indicated percent of the unsaturation thereof present as pendant groups was admixed with 300 phr Wollastonite F-1, 1 phr tris(2-methoxyethoxy) vinyl silane and 2 phr stearic acid. In each run the molded composition was compression molded for 5 minutes at 400°F at a pressure in the range of about 20,000 to about 30,000 psi.

These runs show that it is advantageous to have a vinyl unsaturation of at least about 50 percent or greater to obtain cured compositions exhibiting good tensile properties and flexural modulus properties. The impact values reflect the effect of decreasing amorphous rubbery domains as the vinyl content increases in polymers of the inherent viscosity used.

EXAMPLE V

In the following runs, a tin tetrachloride coupled polybutadiene having a Mooney of 39 ML-4 and an inherent viscosity of 1.62 with 75 percent of the unsaturation being in the form of pendant vinyl groups, was blended with 300 phr Wollastonite F-1, 2 phr calcium stearate, 4 phr 2,5-dimethyl-2,5-bis-(t-butylperoxy)-3-hexyne, the indicated amount of fumaric acid and the indicated amount and type of vinyl silane. In each run the molding composition was compression molded for 5 minutes at 400°F with a pressure in the range of about 20,000 to about 30,000 psi.

TABLE IV

| Run No. | Vinyl % | Inh. Vis. | Flex. Mod. psi ×10⁻³ at 25C | at 150C | Tensile Break, psi at 25C | at 150C | Flex. Str. | Izod Impact[a] |
|---|---|---|---|---|---|---|---|---|
| 1 | 46 | 0.63 | 1190 | 470 | 4210 | 2060 | 7950 | 1.22 |
| 2 | 55 | 0.63 | 1650 | 800 | 5300 | 2660 | 7100 | 1.13 |
| 3 | 70 | 0.71 | 1370 | 710 | 4890 | 2890 | 7590 | 1.04 |
| 4 | 74 | 0.68 | 1440 | 810 | 4780 | 2570 | 5820 | 0.72 |
| 5 | 78 | 0.66 | 1320 | 670 | 4090 | 2710 | 6010 | 0.88 |

[a]Unnotched impact, ⅛-in. thick bars

TABLE V

| Run No. | Silane[a] phr | type | Fumaric Acid,phr | Melt Flow 10×/120C | Flex. Mod. psi ×10⁻³ at 25C | at 150C | Tensile Break, psi at 25C | at 150C | Flex. Str., psi | Shore D Hardness | Unnotched Izod Ft-lb/in. |
|---|---|---|---|---|---|---|---|---|---|---|---|
| 1 | 1 | A | 2 | 2.4 | 1570 | 643 | 6820 | 2570 | 8860 | — | 1.6 |
| 2 | 2 | A | 2 | 2.9 | 1300 | 387 | 6110 | 2370 | 8380 | — | 1.8 |
| 3 | 1 | B | 0 | 3.4 | 1500 | 573 | 7130 | 3230 | 9330 | — | 1.8 |
| 4 | 1 | B | 2 | 2.4 | 1510 | 564 | 6270 | 3070 | 9270 | — | 1.6 |
| 5 | 2 | B | 0 | 3.5 | 1660 | 695 | 6610 | 3240 | 9820 | — | 1.7 |
| 6 | 2 | B | 2 | 2.6 | 1560 | 618 | 6740 | 3070 | 9620 | — | 1.4 |
| 7 | 1 | C | 0 | 2.4 | 1200 | 358 | 4990 | 1810 | 7140 | — | 1.1 |
| 8 | 1 | C | 2 | 2.7 | 1570 | 614 | 6030 | 2290 | 8910 | — | 1.3 |
| 9 | 2 | C | 0 | 1.9 | 1440 | 425 | 5840 | 2440 | 9120 | — | 2.2 |
| 10 | 2 | C | 2 | 2.6 | 1410 | 483 | 6360 | 2420 | 9800 | — | 2.0 |
| 11 | 1 | D | 0 | 1.2 | 1460 | 686 | 4170 | 2240 | 12100 | 91 | — |
| 12 | 1 | D | 2 | 0.2 | 1280 | 539 | 5570 | 2790 | 6920 | 93 | — |
| 13 | 2 | D | 2 | — | 1320 | 553 | 5930 | 3140 | 8290 | 93 | — |
| 14 | 1 | E | 0 | — | 1400 | 630 | 4560 | 1900 | 5950 | 90 | — |
| 15 | 1 | E | 2 | 2.9 | 1390 | 487 | 6070 | 2860 | 8190 | 92 | — |
| 16 | 2 | E | 2 | 3.0 | 1420 | 469 | 7890 | 3250 | 9370 | 92 | — |
| 17 | 2 | F | 2 | 1.7 | 1400 | 447 | 6760 | 2850 | 9200 | 92 | — |
| 18 | 2 | G | 2 | 2.9 | 1940 | 840 | 6900 | 3460 | 8000 | 92 | — |
| 19 | 1 | H | 0 | 1.3 | 1400 | 566 | 4680 | 2320 | 5430 | 90 | — |
| 20 | 1 | H | 2 | 2.3 | 1550 | 733 | 5900 | 2470 | 5730 | 93 | — |

TABLE V-continued

| Run No. | Silane[a] phr | type | Fumaric Acid,phr | Melt Flow 10X/120C | Flex. Mod. psi ×10⁻³ at 25C | at 150C | Tensile Break, psi at 25C | at 150C | Flex. Str., psi | Shore D Hardness | Unnotched Izod Ft-lb/in. |
|---|---|---|---|---|---|---|---|---|---|---|---|
| 21 | 2 | H | 2 | 1.2 | 1350 | 595 | 4880 | 2580 | 6300 | 93 | — |

[a]The silane compositions are as follows:
A = tris(2-methoxyethoxy) vinyl silane
B = gamma-methacryloxypropyltrimethoxy silane
C = vinyl-triacetoxy silane
D = gamma-mercaptopropyltrimethoxy silane
E = beta-(3,4-epoxycyclohexyl)-ethyltrimethoxy silane
F = gamma-glycidoxypropyltrimethoxy silane
G = gamma-aminopropyltrimethoxy silane
H = N-beta-(aminoethyl)-gamma-aminopropyltrimethoxy silane These runs show that various silane coupling agents are operative in the compositions and that somewhat better physical properties are realized when 2 parts of the silane are used per 100 parts of polymer rather than 1 part silane per 100 parts of polymer.

Reasonable variations and modifications are possible within the scope of the foregoing disclosure and the appended claims to the invention.

That which is claimed is:

1. A thermosetting molding composition comprising an at least substantially uniform mixture of at least one polymer of a conjugated diene having from 4 to 10 carbon atoms per molecule, said polymer having at least about 50 percent of the unsaturation thereof in the form of pendant vinyl groups; a particulate metal silicate filler; a silane coupling agent; an organic peroxide curing agent; and an organic acid or an anhydride thereof.

2. A composition in accordance with claim 1 wherein said organic acid is selected from the group consisting of monobasic and polybasic aliphatic saturated and unsaturated carboxylic acids, containing from 2 to 30 carbon atoms per molecule.

3. A composition in accordance with claim 1 wherein said organic acid is a saturated monobasic acid having the formula $C_nH_{2n+1}COOH$ wherein $n$ is an integer in the range of 1 to 29.

4. A composition in accordance with claim 1 wherein said organic acid is stearic acid.

5. A composition in accordance with claim 1 wherein said organic acid is an unsaturated beta-dicarboxylic acid.

6. A composition in accordance with claim 1 wherein said metal silicate filler is at least substantially water insoluble.

7. A composition in accordance with claim 1 wherein said metal silicate filler is a silicate of at least one metal selected from the group consisting of calcium, magnesium, silver, nickel, lead, cadmium, manganese, zinc, copper, and aluminum.

8. A composition in accordance with claim 7 wherein said organic acid is selected from the group consisting of monobasic and dibasic aliphatic saturated and unsaturated carboxylic acids, containing from 2 to 30 carbon atoms per molecule.

9. A composition in accordance with claim 8 wherein said polymer comprises polybutadiene.

10. A composition in accordance with claim 9 wherein said filler comprises calcium silicate.

11. A composition in accordance with claim 10 wherein said acid is stearic acid.

12. A composition in accordance with claim 11 wherein said silane coupling agent comprises tris(2-methoxyethoxy) vinyl silane.

13. A composition in accordance with claim 12 wherein said organic peroxide curing agent comprises at least one of the group consisting of dihydrocarbyl peroxides, peroxy esters, and peroxy ketals.

14. A composition in accordance with claim 12 wherein said organic peroxide curing agent comprises 2,5-dimethyl-2,5-bis(t-butylperoxy)-3-hexyne.

15. A composition in accordance with claim 8 wherein said metal silicate filler is present in an amount in the range of about 40 to about 500 parts by weight per 100 parts by weight of said polymer, and wherein said organic acid or anhydride thereof is present in an amount in the range of about 0.01 to about 10 parts by weight per 100 parts by weight of said polymer.

16. A composition in accordance with claim 15 wherein said silane coupling agent is present in an amount in the range of about 0.1 to about 10 parts by weight per 100 parts by weight of said polymer, and wherein said organic peroxide curing agent is present in an amount in the range of about 1 to about 12 parts by weight per 100 parts by weight of said polymer.

17. A composition in accordance with claim 16 wherein said polymer is polybutadiene, said filler is calcium silicate and said organic acid is stearic acid.

18. A composition in accordance with claim 1 wherein said organic acid is fumaric acid.

19. A composition in accordance with claim 1 wherein said organic acid is maleic acid.

20. A composition in accordance with claim 1 wherein said organic acid is itaconic acid.

21. A molded article prepared from the composition of claim 1.

* * * * *